US009832237B2

(12) United States Patent
Lock et al.

(10) Patent No.: US 9,832,237 B2
(45) Date of Patent: Nov. 28, 2017

(54) COLLABORATIVE ONLINE DOCUMENT EDITING

(71) Applicant: GetGo, Inc., Boston, MA (US)

(72) Inventors: AnneMarie Lock, Brooklyn, NY (US); Elizabeth Thapliyal, Santa Barbara, CA (US); Michael Wookey, Epping (AU); Anil Roychoudhry, Woodcroft (AU)

(73) Assignee: GetGo, Inc., Boston, MA (US)

( * ) Notice: Subject to any disclaimer, the term of this patent is extended or adjusted under 35 U.S.C. 154(b) by 117 days.

(21) Appl. No.: 14/091,848

(22) Filed: Nov. 27, 2013

(65) Prior Publication Data

US 2015/0149404 A1  May 28, 2015

(51) Int. Cl.
*G06F 17/00* (2006.01)
*H04L 29/06* (2006.01)
*G06F 17/30* (2006.01)

(52) U.S. Cl.
CPC ...... *H04L 65/403* (2013.01); *G06F 17/30011* (2013.01); *G06F 17/30165* (2013.01); *G06F 17/30716* (2013.01); *H04L 65/4015* (2013.01)

(58) Field of Classification Search
CPC ............. G06F 17/241; G06F 17/30867; G06F 17/30011; G06F 21/10; G06F 17/30566; G06F 17/30345
See application file for complete search history.

(56) References Cited

U.S. PATENT DOCUMENTS

| 6,072,463 | A | * | 6/2000 | Glaser ..................... G06F 3/038 379/262 |
| 6,507,845 | B1 | | 1/2003 | Cohen et al. |
| 8,452,812 | B2 | | 5/2013 | Pedersen et al. |
| 2011/0249954 | A1 | * | 10/2011 | Meek ..................... H04N 5/772 386/239 |
| 2013/0024418 | A1 | * | 1/2013 | Sitrick et al. ................. 707/608 |
| 2013/0238728 | A1 | | 9/2013 | Fleck et al. |

(Continued)

OTHER PUBLICATIONS

S. Greenberg: "Sharing views and interactions with single-user applications", Proceedings of the Conference on Office Information Systems—, Jan. 1, 1990 (Jan. 1, 1990), pp. 227-237, XP055133013, New York, New York, USA—DOI: 10.1145/91474.91546—ISBN: 978-0-89-792358-4—pp. 227, 232; figure 1.

(Continued)

*Primary Examiner* — Mohammad S Rostami
*Assistant Examiner* — Courtney Harmon
(74) *Attorney, Agent, or Firm* — BainwoodHuang

(57) ABSTRACT

A technique for facilitating online collaboration among users of client machines allows multiple users to work together and concurrently on a set of documents. In response to a request from a user, a server opens a document in a software application running on the server and virtualizes the software application to the client machines. Multiple users can then operate the software application from the respective client machines to edit the document via remote control. The server multiplexes pointer input from the client machines to provide pointer input to the software application from one user at a time. Multiplexing of pointer input takes place seamlessly and automatically in response to user activity with respect to the virtualized software application.

20 Claims, 5 Drawing Sheets

(56) References Cited

U.S. PATENT DOCUMENTS

| | | | | |
|---|---|---|---|---|
| 2013/0305163 | A1* | 11/2013 | Farmer | G06F 9/54 |
| | | | | 715/748 |
| 2014/0033133 | A1* | 1/2014 | Pegg | H04M 3/567 |
| | | | | 715/863 |
| 2014/0149949 | A1* | 5/2014 | Feller | G06F 3/04886 |
| | | | | 715/863 |
| 2014/0237041 | A1* | 8/2014 | Bhat | H04L 65/403 |
| | | | | 709/204 |
| 2015/0095802 | A1* | 4/2015 | Huang | H04L 65/403 |
| | | | | 715/753 |

OTHER PUBLICATIONS

Xia, S., et al.: "Object-Associated Telepointer for Real-Time Collaborative Document Editing Systems", Collaborative Computing: Networking, Applications and Worksharing, 200 5 International Conference on San Jose, CA, USA Dec. 19-21, 2005, Piscataway, NJ, USA, IEEE, Dec. 19, 2005 (Dec. 19, 2005), pp. 1-10, XP010926546, ISBN: 978-1-4244-0030-0.

Kangseok, Kim, et al.: "Modeling, simulation, and practice of floor control for synchronous and ubiquitous collaboration", Multimedia Tools and Applications, Kluwer Academic Publishers, BO, vol. 53, No. 1, Mar. 31, 2010 (Mar. 31, 2013), pp. 213-236, XP019893840, ISSN: 1573-7721, DOI: 10-1007/S11042-010-0508-0.

PCT International Search Report and The Written Opinion from the International Searching Authority, or the Declaration, dated Aug. 13, 2014, 10 pages.

\* cited by examiner

COLLABORATIVE ONLINE DOCUMENT EDITING

BACKGROUND

Collaboration services allow users of client machines to work together in creating and revising documents. For example, users may create documents on the users' own machines and then store the documents online (e.g., in the cloud), where others online can access the documents from any location to review the documents, provide comments, and make changes. Users may also create documents wholly online, e.g., using cloud-based application services, and may collaboratively edit the documents as described above.

Collaboration services are sometimes provided in connection with applications for web conferencing. As is known, web conferencing applications allow users of different client machines to engage in audio or video chats where participants can talk to one another and share data. In a typical arrangement, any participant has the option to share his or her desktop, or a portion thereof, with other participants, such that all participants can view the sharer's desktop on their own machines, along with any documents or applications displayed on the sharer's desktop. The sharer generally has control over the desktop and is able to open and edit documents while others observe. In some examples, the sharer can selectively grant control over the desktop to another participant, who can then operate the sharer's desktop via remote control. For example, a participant can send the sharer a request for desktop control and the sharer can grant the request. Using this interactive protocol, the sharer can pass control over the desktop to different participants one after another.

SUMMARY

The conventional model for desktop sharing allows only one sharer at a time to share a desktop and allows only one participant at a time to operate the sharer's desktop. Unfortunately, however, multiple participants often each have content that they would like to share, yet they must wait their turns before they can share their own desktops. In addition, the conventional model allows only one participant to control and therefore to make changes to a document at a time. For example, the sharer may make changes, or a participant to whom the sharer grants control may make changes, but only one participant can make changes at once. Each participant wishing to change a document displayed on the sharer's desktop must typically engage in the interactive protocol with the sharer before the participant can receive control over the sharer's desktop and make changes to the document.

In contrast with conventional web conferences, an improved technique for facilitating online collaboration among users of client machines allows multiple users to work together and concurrently on a set of documents. In response to a request from a user, a server opens a document in a software application running on the server and virtualizes the software application to the client machines. Multiple users can then operate the software application from the respective client machines to edit the document via remote control. The server multiplexes pointer input from the client machines to provide pointer input to the software application from one user at a time. Multiplexing of pointer input takes place seamlessly and automatically in response to user activity with respect to the virtualized software application and thus avoids the need for an interactive protocol. Users have equal access to documents, and different users can share their own documents at the same time without having to wait.

In some examples, the server opens multiple documents pertaining to the online collaboration in respective software applications at once and virtualizes each of the software applications to allow any user to edit any of the open documents. Users can edit or collaborate on any open document. For example, different users can all edit the same document, or different users (or groups of users) can edit different documents. Each user gets to choose the document he or she wishes to edit at any given time. In some examples, the server persistently stores details of online collaborations to allow users to end collaboration sessions and then easily resume from where they left off. In further examples, users of different client machines can communicate with one another with visual annotations, e.g., by drawing on a common whiteboard shared among all users.

In some examples, the described online collaboration takes place in the context of a web conference, where participants can negotiate edits to particular documents by audio or face-to-face communication. The improved technique thus enables users to work together on documents online in a manner that closely resembles how the users would work together in person.

Certain embodiments are directed to a method of facilitating online collaboration among multiple users of client machines. The method includes opening a document in a software application running on a server in response to the server receiving a document-open request from any of the client machines. The method further includes virtualizing the software application running on the server to the client machines to enable the users of the client machines to concurrently operate the software application running on the server via remote control for editing the document. The method still further includes multiplexing pointer input from the client machines to select pointer input from one client machine at a time as pointer input to the software application running on the server.

Other embodiments are directed to a server constructed and arranged to perform the method described above. Still other embodiments are directed to a computer program product. The computer program product stores instructions, which, when executed on one or more processors of a server, cause the server to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for facilitating online collaboration among users of client machines allows multiple users to work together and concurrently on a set of documents. The improved technique enables users to work together on documents online in a manner that closely resembles how the users would work together in person.

Figure 1:
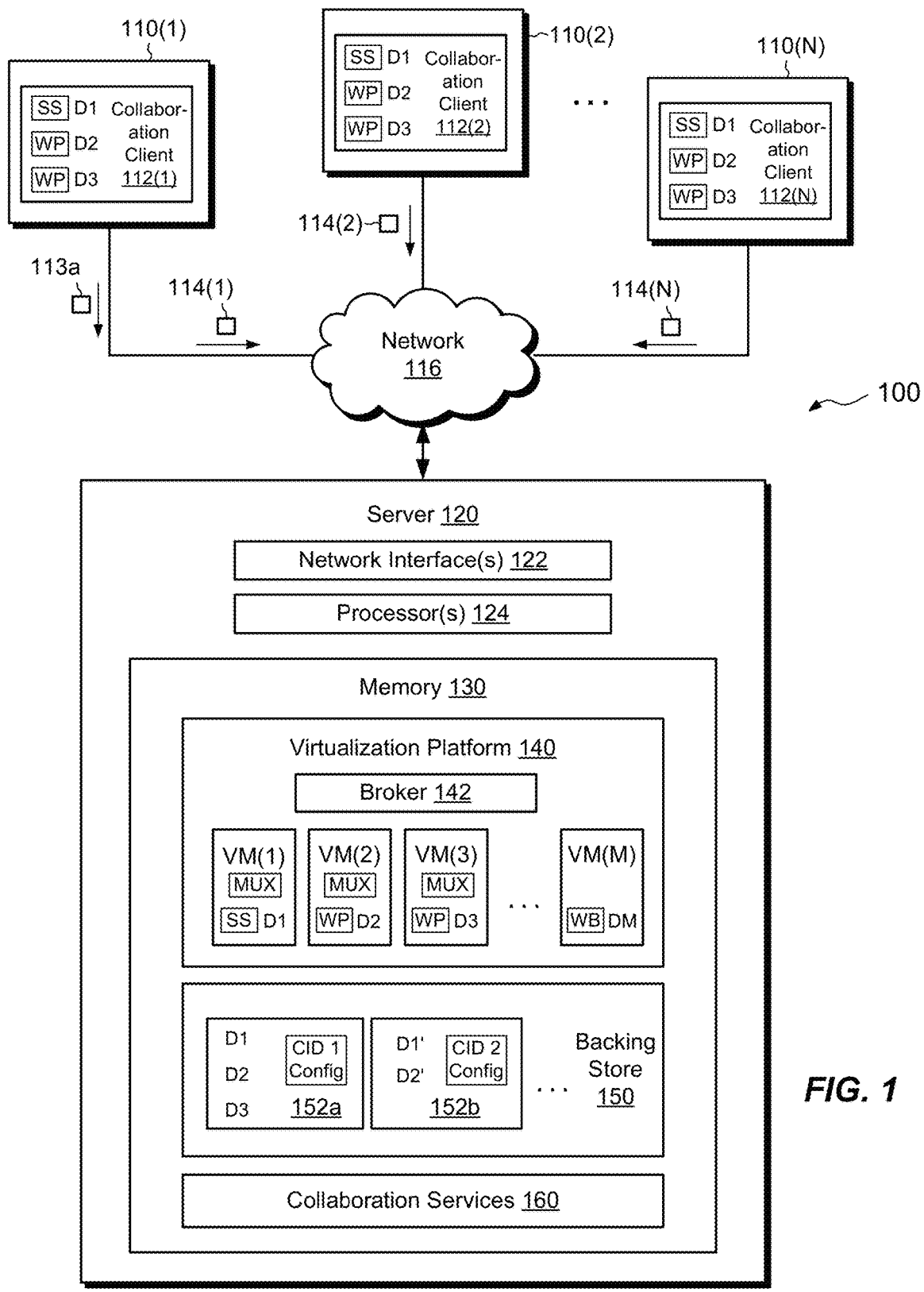
FIG. 1 is a block diagram of an example electronic environment in which embodiments of the improved technique hereof can be practiced.

FIG. 1 shows an example environment 100 in which embodiments of the improved technique hereof can be practiced. Here, multiple client machines 110(1) to 110(N) connect to a server 120 over a network 116. Each of the client machines 110(1) to 110(N) runs a respective collaboration client 112(1) to 112(N), which may be implemented as a stand-alone application, as a browser running a web application, or as some other client software construct or constructs.

The server 120 includes one or more network interfaces 122 (e.g., Ethernet and/or Token Ring cards), a set of processors 124 (e.g., one or more processing chips and/or assemblies), and memory 130. The memory 130 includes both volatile memory (e.g., RAM) and non-volatile memory, such as one or more disk drives, solid state drives and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are known to those skilled in the art but omitted from the figures so as to maintain the focus of this document on the particular improvements hereof.

As further shown in FIG. 1, the memory 130 includes a virtualization platform 140, a backing store 150, and collaboration services 160. The virtualization platform 140 includes a broker 142 and any number of virtual machines VM(1) to VM(M). The broker 142 controls the creation, configuration, and destruction of the virtual machines VM(1) to VM(M). At least some of the virtual machines (e.g., VM(1) to VM(3)) include a multiplexor (MUX). In the example shown, each of the virtual machines VM(1-M) has a particular software application installed thereon for opening a certain type (or types) of document. For example, VM(1) has a spreadsheet (SS) application (e.g., Microsoft Excel, Lotus 1-2-3, Apple Numbers, and so forth) installed thereon for opening spreadsheet document D1, while VM(2) and VM(3) each have a word processor (WP) application (e.g., Microsoft Word, Corel Word Perfect, Apple Pages, and so forth) installed thereon for opening word processing documents D2 and D3, respectively. Also, VM(M) has a whiteboard (WB) application installed thereon for opening a whiteboard document DM. An example of a suitable whiteboard application is Talkboard from Citrix Systems, Inc. of Santa Clara, Calif. In some examples, the virtualization platform 140 can support multiple online collaborations at a time, with different online collaborations involving different sets of users and client machines. For simplicity, though, FIG. 1 shows virtual machines for a single online collaboration.

The backing store 150 persistently stores documents and settings for one or more online collaborations. Participants can add documents to their online collaborations, which the backing store 150 stores in connection with particular collaboration identifiers (CIDs). For example, the backing store 150 stores documents D1, D2, and D3 in a first region 152a in connection with the first online collaboration identified with CID 1. Similarly, the backing store 150 may store documents D1' and D2' in a second region 152b in connection with a second online collaboration identified with CID 2. The regions 152a and 152b correspond to different folders or other storage regions in the backing store 150, and any number of such regions may be provided for any number of online collaborations, with each region storing documents and settings for a respective online collaboration. In an example, each region includes a configuration file (e.g., CID 1 Config or CID 2 Config), which stores settings pertaining to the respective online collaboration. Such settings may include document settings established during online collaboration sessions for the documents opened and/or modified during sessions, including whiteboard documents, undo buffers and redo buffers for documents, lists of collaboration participants (e.g., by user name, IP address and/or some other unique identifier), and other settings. The backing store 150 persistently stores the configuration files, such that online collaboration sessions can be stopped and later resumed without loss of continuity. Upon resuming an online collaboration, the server 120 can access the respective configuration file from the backing store 150 and present users with the same documents open to the same locations and providing the same views as were shown when a previous session for the online collaboration was closed, thereby allowing users easily to resume their work.

Collaboration services 160 provide audio or audio/video conferencing capabilities to optionally enable users of client machines to participate in web conferences in which users can speak to one another during the course of online collaborations. In an example, the collaboration services 160 support multiple simultaneous web conferences for multiple respective online collaboration sessions.

It is understood that the client machines 110(1-N) may be situated at any location(s) that have access to the network 116. For example, different client machines 110(1-N) may be located in different offices, different buildings, different countries, and so forth. Alternatively, the client machines 110(1-N), or some subset of them, may be located together. For example, the user experience of the techniques described herein may work better than typical in-person collaborations, such that users may prefer to use these techniques even if they share the same location. It is understood that the network 116 may be any type of computing network, such as a local area network (LAN), wide area network (WAN), the Internet, or some combination of networks, for example.

Although the server 120 is shown as a single computer or computing device, it is understood that the server 120 may itself include any number of computers or computing devices, which operate together to provide the functionality described. Also, the client machines 110(1-N) may be any type of computing device or devices, and different client machines may be provided as different types of machines. For example, some of the client machines 110(1-N) may be desktop computers, others may be laptop computers, others may be tablet computers, and still others may be smartphones, personal data assistants, and/or other types of machines.

In operation, users of the client machines 110(1-N) can participate in an online collaboration session by operating respective online collaboration clients 112(1-N) on the respective client machines. Such collaboration sessions may be initiated by invitation, as is commonly done for web conferences, such as GoToMeeting. Alternatively, they may be initiated by any user at any time or according to some other scheme. Once multiple users have joined a session, the users may have the option to speak to one another, and in some cases to see one another, using the collaboration services 160. If the users have previously collaborated on the same topic, the users may access an existing collaboration by CID from the backing store 150, to resume work left off from a previous session. Otherwise, the server 120 may create a new CID for the current collaboration session. Here it is assumed that the current online collaboration is for CID 1.

Users may operate the respective collaboration clients 112(1-N) to add documents to the online collaboration for CID 1. For example, the user of client machine 112(1) may perform an action to add spreadsheet document D1 to the online collaboration (here, we assume that D1 was not previously part of the collaboration). Also, the user of client machine 112(2) may perform an action to add word processing document D2 and the user of client machine 112(N) may perform an action to add word processing document D3. Any user can add any number of documents. The documents can originate from any source. For example, some documents may originate from the client machines 112(1-N) themselves (e.g., from a local "Documents" folders), whereas other documents may originate from a network drive. Still other documents may originate from cloud storage facilities. Document of any type may be provided, including, for example, Microsoft Office documents, Apple iWork documents, web pages, PDF files, Google Docs, Visio files, CAD documents, and other types of documents. The backing store 150 persistently stores each document added to the online collaboration in the region specified for the online collaboration (e.g., in region 152a for CID 1). Users may remove any document added to an online collaboration when the document is no longer needed.

In an example, each time a document is added to an online collaboration, the server 120 broadcasts or otherwise sends a document identifier for the added document to all the collaboration clients 112(1-N) of all the client machines 110(1-N), such that all collaboration clients 112(1-N) maintain a complete list of all documents that are part of the online collaboration. In addition, the collaboration clients 112(1-N) may obtain document identifiers of all documents that have been added to the online collaboration when the collaboration clients 112(1-N) are started, on some regular basis, and/or in response to particular events.

Once a document has been added to an online collaboration (e.g., for CID 1) and its document identifier has been sent to the collaboration clients 112(1-N), any user participating in the online collaboration session may cause the document to be opened on the server 120 in an associated application. For example, the user of client machine 110(1) may perform an action, such as double-clicking an icon representing the document in the collaboration client 112(1), which action causes the collaboration client 112(1) to send a document-open request 113a to the server 120. The document-open request 113a includes an identifier of the document to be opened, such as a file name or other identifier. The server 120 receives the document-open request 113a and identifies an associated software application to be used for opening the identified document. In an example, the server 120 stores a list (not shown) that associates file types with respective software applications. For instance, the list associates ".doc" files with Microsoft Word, ".xls" files with Microsoft Excel, ".dwg" files with Autocad, and so on. The server 120 identifies the associated software application and directs the broker 142 to create or locate a virtual machine (e.g., one of VM(1) to VM(M)) in which to open the document. The server 120 may receive different document-open requests, like the request 113a, with each specifying a different document that has been added to the online collaboration. In response to each document-open request, the server 120 opens the requested document in an associated software application in a virtual machine.

In some examples, the broker 142 selects virtual machines for running software applications based on a resource allocation policy. The policy may work in a variety of ways. In one example, as illustrated, the resource allocation policy provides a different virtual machine for each document, such that each virtual machine runs one and only one software application for opening one and only one document. In another example, the policy provides a different virtual machine for each software application, such that, for example, one virtual machine runs only Microsoft Word and opens all requested Word documents, another virtual machine runs only Microsoft Excel and opens all requested Excel documents, and so forth. In yet another example, one virtual machine is provided for each collaboration session and runs any needed software applications for opening all requested documents in the respective session. These are just a few examples. In any case, the broker 142 creates, configures, and destroys virtual machines in accordance with the resource allocation policy and in response to user demand. In the example shown, VM(1) has opened document D1 in Microsoft Excel. In addition, VM(2) has opened document D2 in Microsoft Word and VM(3) has opened document D3 in Microsoft Word. Also, VM(M) has opened whiteboard file WB in Talkboard.

For each document opened in a software application, the server 120 virtualizes the software application that opens the document to provide users of the client machines 110(1-N) with remote access and control over the software application. Taking document D1 as an example, the virtual machine VM(1) virtualizes an instance of Microsoft Excel in which D1 has been opened to provide remote application control over D1 to each of the users through the respective collaboration clients 112(1-N) running on the client machines 110(1-N). Remote application control involves sending display data of the software application running on the virtual machine to each of the collaboration clients 112(1-N) so that each client can display the instance of Excel in which D1 has been opened. Remote application control also involves receiving pointer and/or keyboard input 114(1) to 114(N) from each of the collaboration clients 112(1) to 112(N), respectively, so that the user of each collaboration client can control the virtualized application via the user's own pointer and/or keyboard. In an example, the server 120 virtualizes software applications for remote control to the client machines 110(1-N) by building upon existing application virtualization technology. The server 120 may alternatively virtualize software applications by virtualizing entire desktop(s) of the virtual machine(s) running the software applications. Similar steps to those described above may be performed for virtualizing any number of software applications running respective documents, with any of the users having the ability to control any of the software applications for viewing and/or editing the open documents.

As is known, pointer devices may be implemented with any of mice, trackballs, joysticks, touch screens, touch pads, and the like. Similarly, keyboards may be implemented with any of discrete keyboards, keypads, touchscreens emulating keyboards and/or keypads, and the like. Thus, it is understood that the specific natures of the pointers and keyboards supplying the pointer/keyboard input 114(1-N) depend on the design of the respective client machines 110(1-N).

The electronic environment 100 enables multiple users to access and edit the same document or set of documents at the same time. For example, users of the client machines 110(1-N) can all access document D1 at the same time, and the server 120 seamlessly and automatically selects among pointer/keyboard input 114(1-N) without the need for the users of the client machines 110(1-N) to engage in any interactive protocol. In an example, the server 120 conveys pointer/keyboard input 114(1-N) to VM(1), and the multiplexor (MUX) in VM(1) selects among them.

In an example, the server 120 tracks pointer and/or keyboard input 114(1-N) from each user, such that the pointer/keyboard input from one user is kept separate from that of other users and carries with it a user identifier as it propagates through different software layers of the server 120. Preferably, the server 120 mirrors the pointer position obtained from the input 114(1-N) to the collaboration clients 112(1-N) of all users, to enable each user can see where the other users' pointers are pointing. The server 120 also preferably sends to the client machines 110(1-N) the name or other identifier of the user that the multiplexor has selected for controlling the software application, so that users of the client machines 110(1-N) are able to see the name of the user who is currently controlling the software application for editing the document.

In an example, selections among pointer and/or keyboard inputs 114(1-N) are made based on user activity. For example, if pointer input in 114(1) indicates active pointer movement over a virtualized application window displaying D1 in the collaboration client 112(1) while pointer inputs 114(2-N) indicate little or no pointer movements over corresponding virtualized application windows displaying D1 in collaboration clients 112(2-N), the multiplexor steers pointer input from 114(1) to the software application to give control over the application to the user of the client machine 110(1). Likewise, if pointer input in 114(2) indicates active pointer movement over the virtualized application window displaying D1 while pointer inputs 114(1) and 114(3-N) indicate little or no pointer movement over the corresponding windows, the multiplexor steers pointer input from 114(2) to the software application to give control over the application to the user of the client machine 110(2).

Selection of pointer/keyboard input is desired because most software applications employ graphical user interfaces (GUIs), which allow only a single internal pointer having a single position at a time relative to the respective GUI. For example, one cannot simultaneously point to two different locations in an Excel spreadsheet at once. Rather, the internal pointer has one and only one position relative to the GUI.

Although the multiplexor may select both pointer input and keyboard input for provision to the software application from one user at a time, some embodiments operate to select only pointer input, with keyboard input passed to the software application from multiple users. According to this variant, any user may provide keyboard input to any active application window displayed on their collaboration client, even if the user does not currently have pointer control. This arrangement allows a single user to establish a pointer position but allows any user to add content at the established pointer position without having to move the user's own pointer.

Also, although some of the virtual machines include multiplexors for selecting among pointer/keyboard inputs 114(1-N) from different client machines, some software applications support multiple pointer locations at once and thus do not require multiplexors. Such applications allow simultaneous edits by different users at different locations within a document. Examples of software applications that support multiple pointers include certain Google Doc applications, as well as certain whiteboard applications (e.g., Talkboard).

Preferably, the multiplexor readily passes control from one user to another, such that users are never locked out from editing a document for more than a brief instant. For example, if the user of a first client machine 110(1) briefly stops moving his pointer over the application window, the user of a second client machine 110(2) can take control over the application right away by moving her pointer over the window. The multiplexor effects this change by steering pointer input to the internal pointer of the software application from the second client machine 110(2). Rather than locking out users, the technique herein advantageously manages control over an application through the use of communication among users. For example, users can talk to one another during a collaboration session via web conferencing and thus can negotiate control over an application verbally, rather than relying on control-passing protocols that slow down collaboration and may inhibit joint efforts.

The virtualization platform 140 preferably supports a wide range of software applications for opening and editing virtually any type of documents that users are likely to include in their online collaborations. Unlike customized applications supplied with other collaboration technologies, the supported applications hereof are preferably the same as the applications running on the users' own machines. The applications may thus be the same ones that the users are accustomed to using and are effective at using. Also, the applications can open the users' own documents, which the users created on their own machines.

In some examples, the virtualization platform 140 supports different versions of software applications. Thus, if a user adds a document to an online collaboration which is not supported by the most recent version of the associated application, the virtualization platform 140 can instead spin up an older version of the application and open the document in the older version. In addition, the virtual machines may themselves run different host operating systems. For example, some virtual machines may run Windows, whereas others may run Mac OS, and others still may run UNIX or some other operating system. Further, different virtual machines may run different versions of any operating system, as desired or required with compatibility with documents to be opened.

In some examples, users are given the option to synchronize the version of a document stored in the backing store 150 with the original version that the user added. Synchronization allows users to continue working on documents when they are offline and later to bring the revised versions into the backing store 150 for access by all users. Synchronization also allows changes to documents made during a collaboration session to be mirrored back to the originating copies. In an example, synchronization takes place when a user starts the collaboration client, although synchronization may take place at any suitable time.

Figure 2:
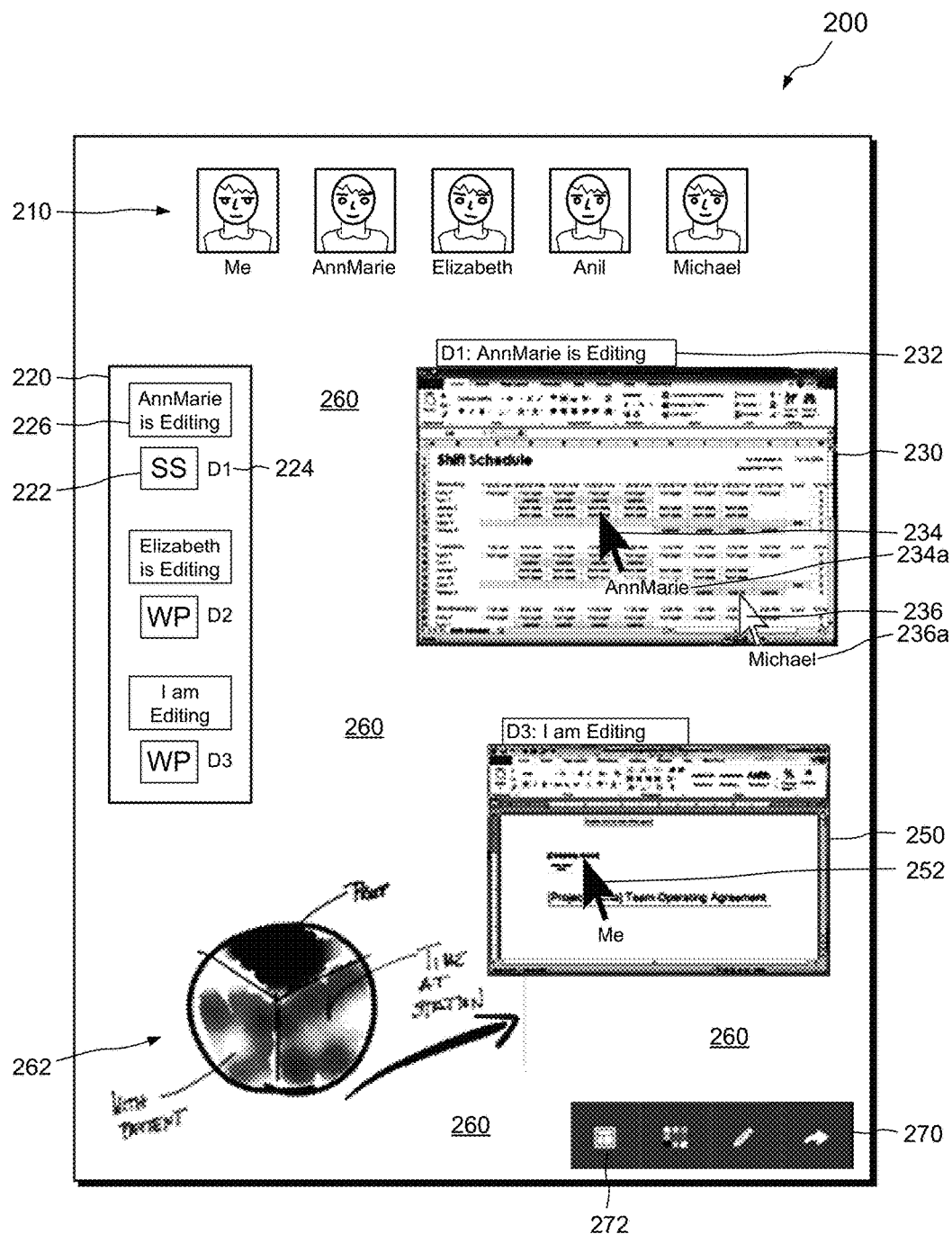
FIG. 2 is an example screenshot of a collaboration client running on a client machine of FIG. 1.

FIG. 2 shows an example screenshot 200 generated by the collaboration client (e.g., one of 112(1) to 112(N)) running on a client machine (e.g., one of 110(1) to 110(N)) during an online collaboration session. Here, it is assumed that five users (AnnMarie, Elizabeth, Anil, Michael, and "I") are participating in the online collaboration session via respective collaboration clients on respective client machines. In this example, the online collaboration is associated with the collaboration identifier CID 1 (see FIG. 1). Although the screenshot 200 pertains to a single user ("Me"), it is understood that the collaboration clients running on other client machines may show similar displays to the screenshot 200, with the user of each of the other machines indicated as "Me" on the respective machines.

As shown, the example screenshot 200 optionally includes a video conferencing region 210 for displaying video feeds from conference participants (including oneself). Users are thus able to maintain real-time, face-to-face conversations as they work on documents. Users whose client machines lack webcams may instead use audio chat, with profile pictures (or no pictures) shown in the spaces provided for their video feeds. Also, users may participate in collaboration sessions without web conferencing if they prefer or if their machines do not support web conferencing.

The example screenshot 200 also includes a region 220 that lists each document that the backing store 150 stores on the server 120 in connection with the current online collaboration (i.e., all documents stored in region 152a for CID 1; see FIG. 1). In an example, the region 220, which is also referred to herein as a "holding dock" or "HD," displays, for each listed document, an icon 222 identifying the document type (e.g., spreadsheet, word processing document, etc.), a document identifier 224 (e.g., a file name or other identifier), and a tag 226, which identifies the user, if there is one, who is currently editing the document. Here, it is shown that document D1 is being edited by AnnMarie, document D2 is being edited by Elizabeth, and document D3 is being edited by "Me," i.e., the user of the client machine displaying the screenshot 200. Rather than indicating generic document types, icons 222 may alternatively show vendor-specific application icons that indicate the specific software applications in which the respective documents are opened.

The example screenshot 200 also includes an application window 230. The application window 230 shows a virtualized instance of a spreadsheet program (e.g., Excel) running document D1. A tag 232 may be provided above or otherwise in connection with the application window 230, to identify the document (D1) and the user currently editing the document (AnnMarie). Consistent with the example shown in FIG. 1, the document D1 has been opened and virtualized by VM(1), such that all participants can edit D1 and control the instance of the spreadsheet application via remote control through their respective collaboration clients.

The screenshot 200 shows two pointers 234 and 236 over the application window 230. Tags 234a and 236a identify the users that are controlling the pointers (here, AnnMarie and Michael, respectively). It can be seen that AnnMarie's pointer 234 is currently controlling the application instance (as "AnnMarie is editing") and thus that the server 120 is steering input from AnnMarie's pointer to the software application to establish the internal pointer position of the application instance running in VM(1). Michael's pointer 236 is displayed but is currently inactive. If AnnMarie were to pause editing and Michael were then to move his pointer 236 over the application window 230, control would switch to Michael's pointer 236, with the internal pointer location of the running application instance made to correspond to the location of Michael's pointer 236. Control over the application window 230 can thus be made to switch back and forth between AnnMarie and Michael, or among any users, in response to user activity within the application window 230.

An application window 250 shows a simpler case, where the user "I" is editing document D3. Consistent with the example shown in FIG. 1, the document D3 has been opened and virtualized by VM(3), such that all participants can edit D3 and control the instance of the word processing application via remote control through their respective collaboration clients. Here, however, a pointer 252 is the only pointer positioned over the application window 250, so the pointer 252 is selected for providing the location of the internal pointer of the application instance for D3. Other users may later move their pointers over the application window 250 displayed on their own machines, however, to seamlessly take control of the running application instance.

In an example, users can open a document displayed in the HD 220 by double-clicking the icon 222 representing the document in the HD 220 or by performing some other user action. In response to the user action, the collaboration client sends a document-open request (like the request 113a) to the server 120. The document-open request directs the broker 142 to assign a virtual machine to run an associated application instance for opening the document. Assigning a virtual machine may include creating and configuring a new virtual machine, if no virtual machine meeting the resource allocation policy is currently available. The server 120 opens the document in the associated application on the assigned virtual machine and virtualizes the application so that an application window for the application can be viewed in each of the collaboration clients 112(1-N).

Users can also close a document. A user may close a document via the application window displaying the document (e.g., by executing a File→Close command), by right-clicking the icon 222 for the document in the HD 220 and selecting an option to close the document, or by any other suitable means.

Users can add new documents to the online collaboration. In one example, a user drags an open file from the user's desktop, or a file icon from the desktop, folder, network location, Internet location, or other location into the HD 220 or into some other displayed region or regions, such as the region 260. When the user drops the document into the region, the collaboration client creates a copy of the document and uploads the copy to the server 120, where the copy of the document is stored in the backing store 150 in the region specified for the current CID. Users can similarly remove documents from an online collaboration, such as by right-clicking the icon 222 for each document to be removed in the HD 220 and selecting an option to delete the document.

The display shown in the screenshot 200 may be referred to as a "workspace," and each user may customize certain features of the workspace displayed by their respective collaboration client according to the user's own needs and preferences. For example, users can hide particular application windows and may resize application windows for easier viewing and editing. Also, the size and proportions of the workspace itself can be varied on a per-user basis. User-specific settings for the workspace may be stored in a file on the user's client machine or in any other suitable way.

In some examples, the whiteboard DM running on the server 120 (e.g., in VM(M)) serves as a background 260 of the workspace, which is preferably common to all users, i.e., the same whiteboard DM is displayed as a background for all collaboration clients 112(1-N) participating in the same online collaboration session. Users can thus draw on the common whiteboard to make notes, sketches, and other marks, with such marks being viewable and editable by all users. As the whiteboard application (e.g., Talkboard) supports simultaneous inputs from multiple users, users can mark on the whiteboard at the same time, with results being immediately viewable by all users. In some examples, annotations on the whiteboard are superimposed on the application windows (e.g., 230, 250), so that users can see both the application windows and the annotations. Whiteboard annotations can thus extend into the application windows to refer to features on the displayed documents.

The screenshot 200 also shows whiteboard controls 270. In addition to the usual controls (e.g., color, pencil, and share), the controls 270 also include a control 272 to synchronize workspaces. When a user clicks the control 272, the server 120 sends a request to all other users in the session asking whether to reconfigure their own workspaces to match the workspace of the user who clicked the control 272. Users can accept or reject the request.

Figure 3:
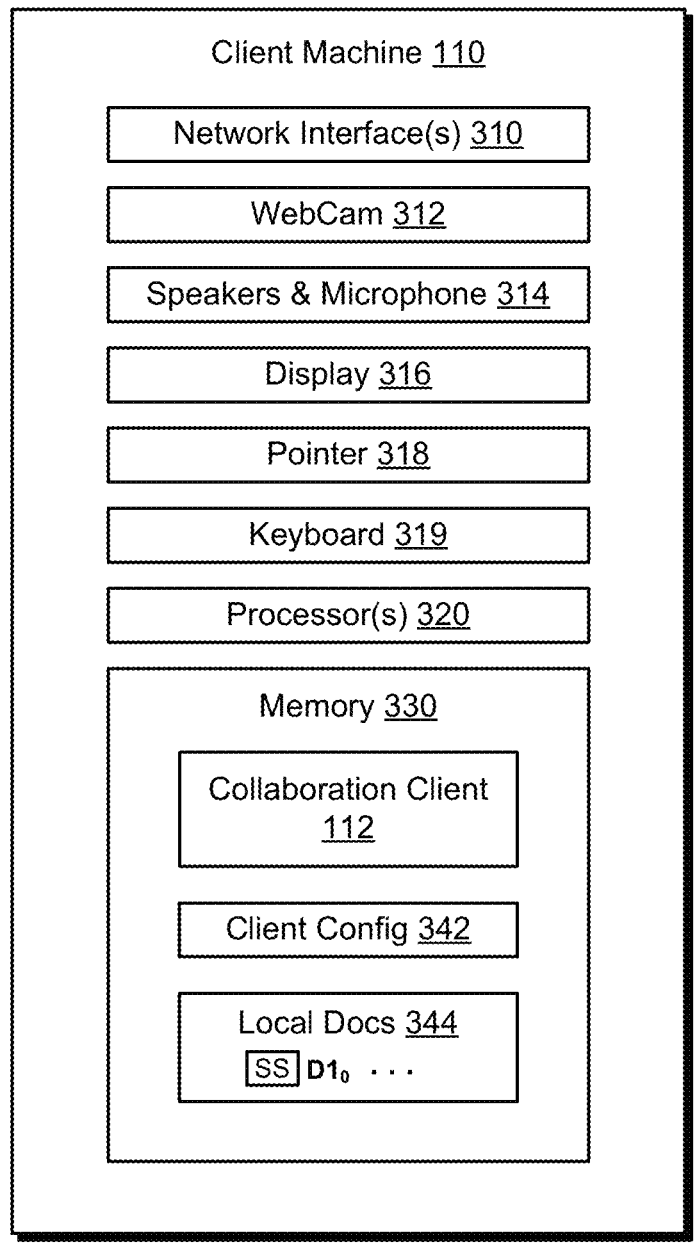
FIG. 3 is a block diagram of an example client machine of FIG. 1.

FIG. 3 shows an example client machine 110 in greater detail. The client machine 110 is representative of the client machines 110(1-N), although details of client machines may vary one to the next based on the types of client machines used.

In the example shown, the client machine 110 includes one or more network interfaces 310 for connecting to the network 116. The network interface(s) may include, for example, one or more Ethernet cards, Token Ring cards, Wi-Fi interfaces, cell phone network interfaces, and so forth, or any combination of the foregoing. The client machine may also include a webcam 312, speakers and a microphone 314, a display 316, a pointer device 318, a keyboard 319, a set of processors 320 and memory 330. In some examples, the display 316, pointer 318, and/or keyboard 319 may be provided in the form of a single touchscreen, and the speaker and microphone 314 may be replaced with a Bluetooth headset or an audio jack into which a conventional headset may be plugged.

The memory 330 may include both volatile memory (e.g., RAM) and non-volatile memory, such as one or more disk drives, solid state drives and the like. The set of processors 320 and the memory 330 together form client control circuitry, which is constructed and arranged to carry out various methods and functions as described herein in connection with the client devices 110(1-N). Also, the memory 330 includes a variety of software constructs realized in the form of executable instructions. When the executable instructions are run by the set of processors 320, the set of processors 320 are caused to carry out the operations of the software constructs. Although certain software constructs are specifically shown and described, it is understood that the memory 330 typically includes many other software constructs, which are known to those skilled in the art but omitted from the figures so as to maintain the focus of this document on the particular improvements hereof.

As further shown in FIG. 3, the memory 330 includes a collaboration client 112, which is representative of the collaboration clients 112(1-N), a client configuration file 342, and local documents 344. The collaboration client 112 may include an embedded remote presentation viewer, such as Citrix Receiver or VNC (Virtual Network Computing) Client. The client configuration file 342 stores workspace configuration information of the collaboration client 112, such as the hidden/shown status, sizes, and placements of application windows, as well as the size, proportions, and placement of the workspace as a whole. In some examples, the collaboration client 112 accesses the client configuration file 342 on startup to restore any settings that were in place when collaboration client 112 was last closed, thereby allowing users to resume collaboration with their previous settings. The local documents 344 include documents stored on the client machine 110, which may include documents which have been added to an online collaboration. For example, document $D1_0$ may be the source of document D1 stored in the region 152a of the backing store 150.

Figure 4:
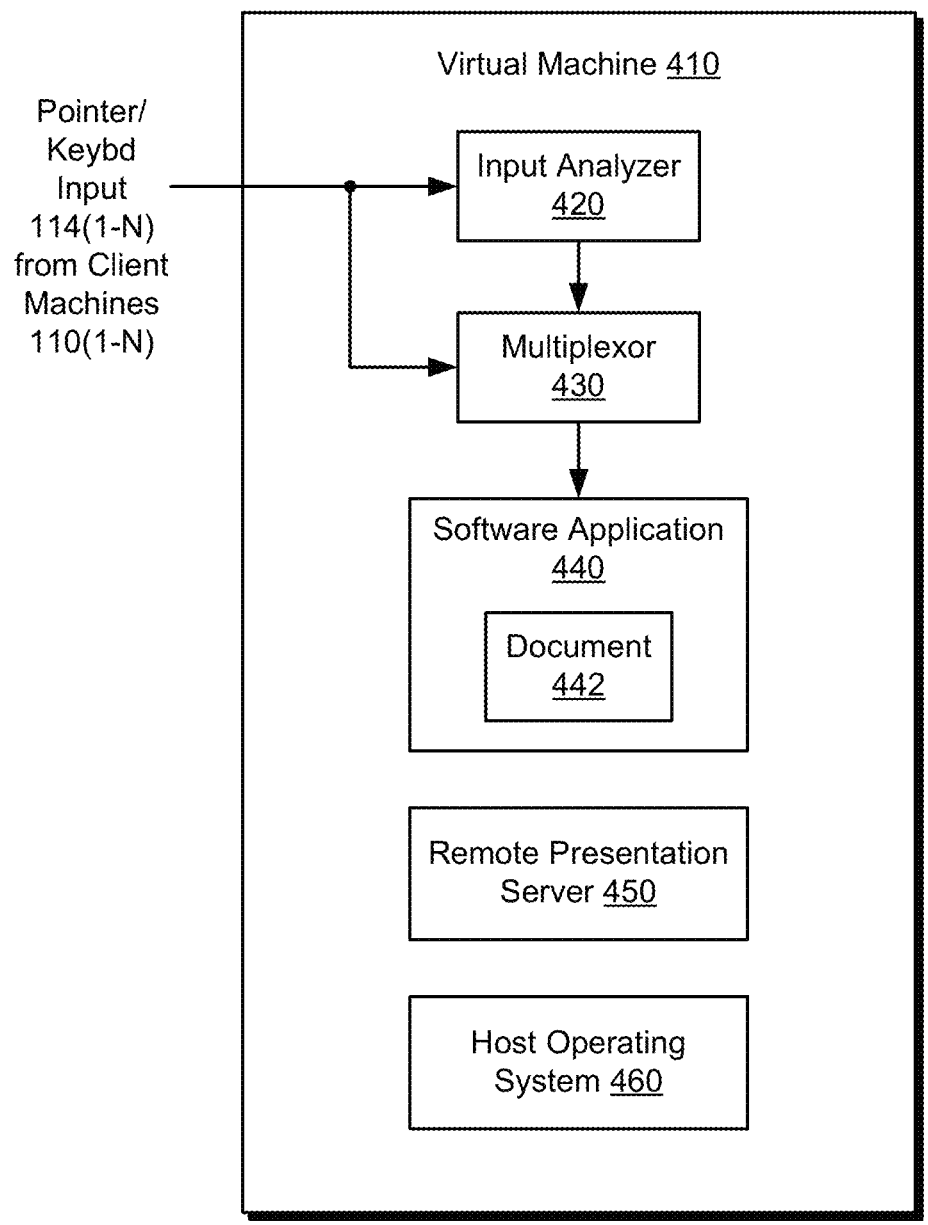
FIG. 4 is a block diagram of an example virtual machine that runs in a virtualization platform of FIG. 1.

FIG. 4 shows an example virtual machine 410, which is representative of the virtual machines VM(1) to VM(M). As shown, the virtual machine 410 includes an input analyzer 420, a multiplexor 430 (similar to each "MUX" shown in FIG. 1), a software application 440 (similar to the applications run in the virtual machines of FIG. 1), a remote presentation server 450, and a host operating system 460. The software application 440 may open a document 442 (similar to the documents D1, D2, and D3). The input analyzer 420 and multiplexor 430 may be omitted from virtual machines that run applications that support multiple simultaneous pointer locations.

In an example, the host operating system 460 establishes an environment in which the software application 440 and other software constructs are run. Any suitable host operating system 460 may be used (e.g., Windows, Mac OS, Unix, etc.) and in any suitable version, as necessary and/or desirable for opening the document 442. The remote presentation server 450 performs the role of virtualizing the software application 440 to the client machines 110(1-N) and may be implemented, for example, using Citrix HDX or VNC Server.

In operation, the virtual machine 410 receives pointer and/or keyboard input 114(1-N) from the client machines 110(1-N) and provides such input to the input analyzer 420 and to the multiplexor 430. The input analyzer 420 analyzes the input to detect patterns that indicate which set of pointer and/or keyboard input should be steered to the software application 440, and the multiplexor 440 operates to perform the steering in response to input from the input analyzer 420. For example, if the input analyzer 420 detects significant pointer movement or keyboard activity in the input 114(1) but little or no pointer movement or keyboard activity in input 114(2), the input analyzer 430 may direct the multiplexor 430 to select input 114(1) for provision to the software application 440 for establishing its internal pointer position. The input analyzer 420 may thus continually analyze the input 114(1-N) to determine which set of input 114(1-N) should be selected at any given time.

The input analyzer 420 may operate in a range of ways, from simple to sophisticated. A more sophisticated example of operation may involve tracking pointer selections in addition to pointer position or movement. Pointer selections include pointer clicks (or taps, etc.), including right-button-clicks and left-button-clicks, as well as double-clicks and pointer releases. In one example, the input analyzer 420 correlates pointer selections with pointer movements over time in selecting sources for pointer input. For example, if a first user right-clicks in an application window, then moves the pointer to a different location within the same window, and then releases the pointer, the input analyzer 420 may interpret this sequence as part of a single operation (e.g., a context-sensitive menu selection) and provide pointer control to the first user even if a second user has temporarily been assigned control during the time it took for the first user to complete the sequence. For example, if the first user right-clicks and holds, but then a second user moves her pointer in the window, the input analyzer 420 may give control to the second user based on the second user's activity. However, if the first user shortly later releases in a different location, the input analyzer 420 may recognize this as a special case and restore pointer control to the first user, so that the operation of the first user can be completed.

Figure 5:
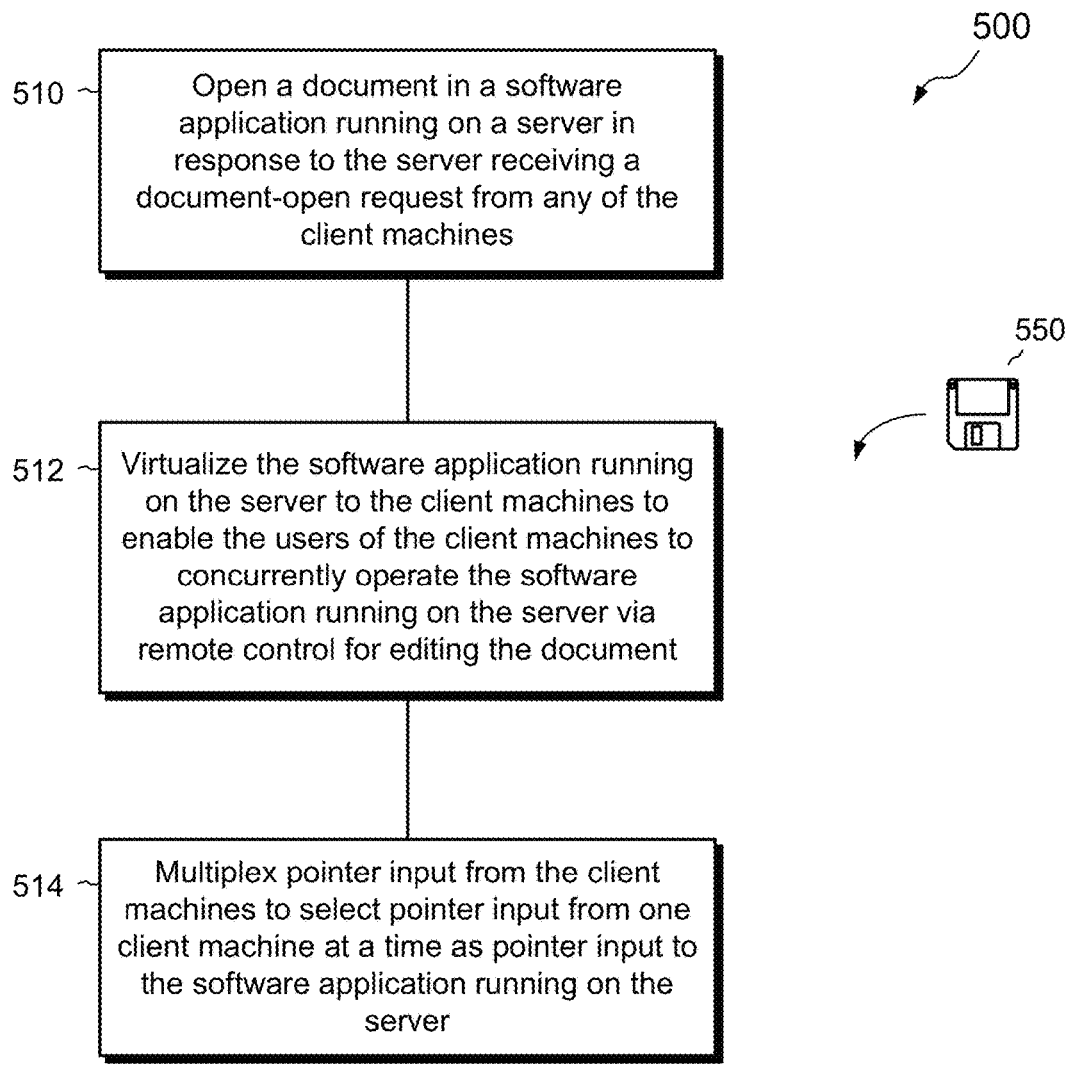
FIG. 5 is a flowchart showing an example method for performing collaborative online document editing in the environment of FIG. 1.

FIG. 5 illustrates a process 500 for facilitating online collaboration among multiple users of client machines. The process 500 may be carried out in connection with the computing environment 100 and may be performed by the software constructs described in connection with FIGS. 1 and 4. These software constructs reside in the memory 130 of the server 120 and are run by the set of processors 124. The various acts of the process 500 may be ordered in any suitable way. Accordingly, embodiments may be constructed in which acts are performed in orders different from those illustrated, which may include performing some acts simultaneously, even though the acts are shown as sequential in the illustrated embodiments.

At step 510, a document is opened in a software application running on a server in response to the server receiving a document-open request from any of the client machines. For example, as described in connection with FIG. 1, document D1 is opened in an instance of Microsoft Excel running in VM(1) on the server 120. The document D1 may be opened in response to receipt by the server 120 of the document-open request 113*a*, which may originate from the client machine 110(1).

At step 512, the software application running on the server is virtualized to the client machines to enable the users of the client machines to concurrently operate the software application running on the server via remote control for editing the document. For example, a remote presentation server 450 running in VM(1) virtualizes the instance of Excel in which document D1 has been opened to all of the collaboration clients 112(1-N) running on the client machines 110(1-N), to enable users of the client machines 110(1-N) to operate the virtualized application by remote control. Any user may then control the application to edit the document from the respective collaboration client.

At step 514, pointer input from the client machines is multiplexed to select pointer input from one client machine at a time as pointer input to the software application running on the server. For example, a multiplexor 430 receives pointer and/or keyboard input 114(1-N) from the client machines 110(1-N) and selects pointer and/or keyboard input from one of the client machines at a time for establishing the position of the internal pointer of the software application.

An improved technique has been described for facilitating online collaboration among users of client machines, which allows multiple users to work together and concurrently on a set of documents. In response to a request from a user, a server 120 opens a document in a software application running on the server 120 and virtualizes the software application to the client machines 110(1-N). Multiple users can then operate the software application from the respective client machines 110(1-N) to edit the document via remote control. The server multiplexes pointer input from the client machines to provide pointer input to the software application from one user at a time. Multiplexing of pointer input takes place seamlessly and automatically in response to user activity with respect to the virtualized software application.

In addition, the improved technique hereof allows users to benefit from a truly collaborative environment in which users can lay out various documents and all come together for group editing, as if around a virtual conference table. Multiple documents can be laid out before the users, and the users can pick any documents and work collaboratively with any other users as they operate together as an online team.

Having described certain embodiments, numerous alternative embodiments or variations can be made. For example, although embodiments hereof have been described in connection with web conferencing, this is merely an example. Although web conferencing adds to the collaboration experience, certain embodiments hereof can be practiced without the benefit of web conferencing.

Also, although embodiments have been shown and described using virtual machines, this is also merely an example. Alternatively, running and virtualizing applications to client machines 110(1-N) is performed using one or more physical machines rather than virtual machines.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 550 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of facilitating online collaboration among multiple users of client machines, comprising:

opening a document in a software application running on a server in response to the server receiving a document-open request from any of the client machines;

virtualizing the software application running on the server to the client machines to enable the users of the client machines to concurrently operate the software application running on the server via remote control for editing the document by the software application running on the server; and multiplexing pointer input from the client machines to select pointer input from one client machine at a time as pointer input to the software application running on the server, wherein the software application running on the server has a graphical user interface (GUI) that supports one and only one internal pointer, the internal pointer having a single location relative to the GUI of the software application, wherein multiplexing pointer input includes steering pointer input from one client machine at a time to the software application to supply the location of the internal pointer supported by the software application, wherein multiplexing pointer input further includes:
  steering pointer input from a first client machine to the software application for establishing the location of the internal pointer supported by the software application; and
  in response to an indication of pointer movement relative to the GUI of the software application in pointer input received from a second client machine, steering the pointer input from the second client machine to the software application for establishing the location of the internal pointer supported by the software application, and wherein the method further comprises
  mirroring a pointer position from each of the client machines to each of the other client machines to enable each user to visualize the location of each other user's pointer; and
  tagging each user's pointer to display a name of each user in connection with that user's pointer.

2. The method of claim 1, further comprising:
identifying a name of a user of a client machine from which pointer input is currently being steered for establishing the location of the internal pointer supported by the software application; and
sending the identified name of the user to the client machines to enable users of the client machines to see the name of the user who is currently controlling the software application for editing the document.

3. The method of claim 1,
wherein the pointer input from the first client machine includes (i) pointer location input of a pointer of the first client machine relative to the GUI of the software application and (ii) pointer selection input from the first client machine indicating pointer selections made by a user of the first client machine, and
wherein multiplexing pointer input further includes, after steering the pointer input from the second client machine to the software application:
  receiving pointer selection input from the first client machine indicating that the user of the first client machine has made a pointer selection; and
  steering the pointer location input from the first client machine to the software application for establishing the location of the internal pointer when the user of the first client machine made the pointer selection, such that the software application running on the server associates the pointer selection made by the user of the first client machine with the pointer location of the first client machine when the user of the first client machine made the pointer selection.

4. The method of claim 1, wherein the document is a first document, the software application is a first software application, and the method further comprises:

opening a second document in a second software application running on the server in response to the server receiving a second document-open request from any of the client machines;
virtualizing the second software application running on the server to the client machines to enable the users of the client machines to concurrently operate the second software application running on the server via remote control for editing the second document, at the same time that the server is virtualizing the first software application to the client machines to enable operation of the first software application via remote control for editing the first document; and
multiplexing pointer input from the client machines to select pointer input from one client machine at a time as pointer input to the second software application running on the server.

5. The method of claim 4, wherein the method is performed in a context of an online collaboration among the users of the client machines, and wherein the method further comprises:
assigning a collaboration identifier to the online collaboration; and
storing the first document and the second document on the server in connection with the collaboration identifier.

6. The method of claim 5,
wherein storing the first document on the server is performed in response to receiving an indication from the first client machine that a user of the first client machine has performed an action to add the first document to the online collaboration,
wherein storing the second document on the server is performed in response to receiving an indication from the second client machine that a user of the second client machine has performed an action to add the second document to the online collaboration.

7. The method of claim 6, further comprising:
transmitting to the client machines document identifiers of all documents stored on the server in connection with the online collaboration; and
receiving an additional document-open request from any of the client machines, the additional document-open request specifying one of the document identifiers transmitted to the client machines and requesting that the server open the document identified with the document identifier in a software application.

8. The method of claim 6,
wherein the action to add the first document to the online collaboration is an action to add the first document from a storage location on the first client machine, and
wherein the action to add the second document to the online collaboration is an action to add the second document from a storage location on a computer network to which the second client machine is connected.

9. The method of claim 6, further comprising synchronizing the first document stored on the server with a copy of the first document stored on the first client machine.

10. The method of claim 6, wherein the method further comprises:
opening a third document in a third software application in response to the server receiving a third document-open request from any of the client machines; and
virtualizing the third software application running on the server to the client machines to enable the users of the client machines to concurrently operate the third software application running on the server via remote control for editing the third document, wherein the third software application supports multiple pointer locations at a time relative to the third document to allow simultaneous edits of the third document by different users of the client machines at different locations within the third document.

11. The method of claim 6, further comprising:
virtualizing a whiteboard application running on the server to the client machines to enable users of the client machines to concurrently operate the whiteboard running on the server via remote control; and
persistently storing a state of the whiteboard in connection with the online collaboration such that the client machines can access changes to the whiteboard after the online collaboration has ended and when the collaboration session is later resumed.

12. The method of claim 1, further comprising performing web conferencing among the client machines, including exchanging audio signals among the client machines to enable users of the client machines to communicate verbally as the users collaborate in editing the document.

13. The method of claim 1, further comprising performing web conferencing among the client machines, including exchanging audio and video signals among the client machines to enable users of the client machines to communicate verbally and face-to-face as the users collaborate in editing the document.

14. The method of claim 1, wherein the server stores a list that associates multiple file types with respective software applications, and wherein opening the document includes the server (i) server identifying a file type of the document from the document-open request and (ii) opening the document in a software application that the list associates with the file type.

15. The method of claim 14, wherein the software application running on the server is one of (i) a word processing application or (ii) a spreadsheet application.

16. The method of claim 14, wherein the server is physically distinct from any of the client machines and is coupled to the client machines over a computing network.

17. The method of claim 1,
wherein steering pointer input from the first client machine to the software application grants the first client machine control over the software application,
wherein steering pointer input from the second client machine to the software application grants the second client machine control over the software application, and
wherein steering the pointer input from the second client machine to the software application is performed automatically after steering pointer input from the first client machine to the software application in response to detecting the pointer movement relative to the GUI in the pointer input from the second client machine.

18. A server for facilitating online collaboration among multiple users of client machines, the server comprising:
a set of processors; and
memory, coupled to the set of processors, the set of processors and the memory together form control circuitry constructed and arranged to:
open a document in a software application running on the server in response to the server receiving a document-open request from any of the client machines;
virtualize the software application running on the server to the client machines to enable the users of the client machines to concurrently operate the software application running on the server via remote control for editing the document by the software application running on the server; and
multiplex pointer input from the client machines to select pointer input from one client machine at a time as pointer input to the software application running on the server,
wherein the software application running on the server has a graphical user interface (GUI) that supports one and only one internal pointer, the internal pointer having a single location relative to the GUI of the software application,
wherein the control circuitry, constructed and arranged to multiplex pointer input, is further constructed and arranged to:
steer pointer input from a first client machine to the software application for establishing the location of the internal pointer supported by the software application; and
in response to an indication of pointer movement relative to the GUI of the software application in pointer input received from a second client machine, steer the pointer input from the second client machine to the software application for establishing the location of the internal pointer supported by the software application,
and
wherein the control circuitry is further constructed and arranged to:
mirror a pointer position from each of the client machines to each of the other client machines to enable each user to visualize the location of each other user's pointer; and
tag each user's pointer to display a name of each user in connection with that user's pointer.

19. A computer program product including a non-transitory computer-readable medium having instructions which, when executed by a set of processors of a computing device, cause the set of processors to perform a method for facilitating online collaboration among multiple users of client machines, the method comprising:
opening a document in a software application running on a server in response to the server receiving a document-open request from any of the client machines;
virtualizing the software application running on the server to the client machines to enable the users of the client machines to concurrently operate the software application running on the server via remote control for editing the document by the software application running on the server; and
multiplexing pointer input from the client machines to select pointer input from one client machine at a time as pointer input to the software application running on the server,
wherein the software application running on the server has a graphical user interface (GUI) that supports one and only one internal pointer, the internal pointer having a single location relative to the GUI of the software application, and
wherein multiplexing pointer input further comprises:
steering pointer input from a first client machine to the software application for establishing the location of the internal pointer supported by the software application; and
in response to an indication of pointer movement relative to the GUI of the software application in pointer input received from a second client machine, steering the pointer input from the second client machine to the software application for establishing the location of the internal pointer supported by the software application, and wherein the method further comprises:

mirroring a pointer position from each of the client machines to each of the other client machines to enable each user to visualize the location of each other user's pointer; and tagging each user's pointer to display a name of each user in connection with that user's pointer.

20. The computer program product of claim 19, wherein the method further comprises performing web conferencing among the client machines, including exchanging audio signals among the client machines to enable users of the client machines to communicate verbally as the users collaborate in editing the document.

* * * * *